United States Patent
Panchal et al.

(10) Patent No.: US 7,251,267 B2
(45) Date of Patent: Jul. 31, 2007

(54) SYSTEM AND METHOD FOR DETERMINING A BEST ROUND TRIP DELAY INDICATOR

(75) Inventors: Jignesh S. Panchal, Scotch Plains, NJ (US); Christopher G. McHarg, Winfield, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 744 days.

(21) Appl. No.: 10/319,191

(22) Filed: Dec. 13, 2002

(65) Prior Publication Data

US 2004/0114673 A1 Jun. 17, 2004

(51) Int. Cl.
*H04B 1/00* (2006.01)

(52) U.S. Cl. ............... 375/148; 375/316; 375/147; 455/39; 455/500

(58) Field of Classification Search ............... 375/148, 375/147, 316; 455/436, 403, 440, 39, 500
See application file for complete search history.

(56) References Cited

U.S. PATENT DOCUMENTS

| | | | |
|---|---|---|---|
| 5,982,758 A * | 11/1999 | Hamdy | 370/331 |
| 6,433,739 B1 * | 8/2002 | Soliman | 342/387 |
| 6,754,252 B1 * | 6/2004 | Aldaz | 375/148 |
| 6,785,321 B1 * | 8/2004 | Yang et al. | 375/137 |
| 2002/0034947 A1 * | 3/2002 | Soliman | 455/436 |
| 2003/0134648 A1 * | 7/2003 | Reed et al. | 455/456 |

* cited by examiner

Primary Examiner—Mohammed Ghayour
Assistant Examiner—Leila Malek (57) ABSTRACT

A system and method for determining a round trip delay (RTD) indicator for mobile telephone signals originating from a mobile unit and received at a plurality of base stations in a wireless telecommunications system comprising at least some base stations using rake receivers, each rake receiver comprising a plurality of fingers. The method includes the steps of: collecting one or more finger characteristics from one or more rake receiver fingers assigned to one or more multi-path components of a signal; determining a finger lock category for at least one of the assigned one or more rake receiver fingers using the collected one or more finger characteristics; selecting a rake receiver finger from the one ore more rake receiver fingers using the determined finger lock categories, wherein the selected rake receiver finger has an associated RTD; and recording the RTD indicator corresponding to the selected finger. The system includes a processor configured to perform the foregoing steps.

20 Claims, 4 Drawing Sheets

SYSTEM AND METHOD FOR DETERMINING A BEST ROUND TRIP DELAY INDICATOR

FIELD OF THE INVENTION

The invention disclosed broadly relates to the field of mobile telecommunications and more particularly relates to a system for determining the best (most accurate) round trip delay (RTD) indicator from among RTD indicators associated with various fingers within rake receivers in base stations in communication with a mobile unit.

BACKGROUND OF THE INVENTION

Wireless communication systems comprise a plurality of base stations (cell sites) and a plurality of mobile telephones (mobile units). The base stations are distributed geographically to define a plurality of cells. A cell is a geographical area representing the signal coverage of a cell site or a base station.

The base stations are connected to the public switched telephone network (PSTN) via a mobile telephone switch office (MTSO) using wire-line connections. The base stations communicate with the mobile units over wireless links or communication channels. As mobile units move among the cells, the base stations transfer the wireless links with the mobile units to other base stations in a procedure called handoff. An important objective of handoff technology is to accomplish a transfer of a conversation in progress without interruption (a soft handoff) or with minimal interruption (a hard handoff). To accomplish a soft handoff it is necessary for a mobile signal to be received by more than one base station.

Currently there are several types of wireless telecommunication systems in the world based on different modulation/demodulation technologies. The Code Division Multiple Access (CDMA), based on the IS95/IS2000 air interface standard, and the UMTS (Universal Mobile Telecommunication System) are among them. The CDMA and the UMTS systems are principally based on the direct sequence (DS) spread spectrum modulation/demodulation technology.

Both base stations and mobile units operating under DS spread spectrum modulation/demodulation technologies use a set of receivers called rake receivers to receive signals. A rake receiver employs a receiver technique which uses several baseband correlators (also called "fingers") to individually process several multi-path components of a received signal. The correlator outputs are combined, called rake combining, to achieve improved communications reliability and performance. Using a rake receiver and the rake combining method, the base station demodulates a number of multi-path components of mobile transmitted signals to accomplish multi-path reception.

RTD is the time it takes for a signal to travel from the base station to the mobile unit and back to the base station, or vice versa. Each finger of the base station's rake receiver measures a RTD for the multi-path component of the mobile transmitted signal which the finger demodulates. The RTD indicator associated with each finger is dependent on that multi-path component and it will be unique among other assigned fingers' RTD indicators.

Along with recording the RTD indicators, each base station measures a set of RTD quality parameters, such as TIMESTAMP and ENERGY values, for an RTD indicator. The TIMESTAMP indicates the time at which the RTD indicator was collected at the base station. The ENERGY value indicates the energy level of a signal received at a finger in a rake receiver at a base station. These quality parameters form the RTD quality metric. The quality metric indicates the quality (accuracy) of the RTD indicator.

The operation of a wireless telecommunication system may require determining the geographic location (geo-location) of a specific mobile unit, e.g. for emergency 911 service. Geo-location of a mobile unit may be obtained using algorithms such as AFLT (Advanced Forward Link Trilateration) and EFLT (Enhanced Forward Link Trilateration). Geo-location accuracy using these algorithms is dependent upon obtaining accurate round trip delay (RTD) indicators.

SUMMARY OF THE INVENTION

Briefly according to the invention a method for obtaining a round trip delay (RTD) indicator from one or more RTD indicators associated with one or more rake receiver fingers assigned to a mobile unit based on a plurality of finger lock categories comprises the steps of: collecting finger characteristics for at least one of a plurality of rake receiver fingers assigned to a mobile telephone; classifying each of the assigned plurality of rake receiver fingers into one of a plurality of finger lock categories; and selecting, based on the finger lock category for each assigned finger, a finger from which to obtain the RTD indicator.

DESCRIPTION OF THE PREFERRED EMBODIMENT

Figure 1A:
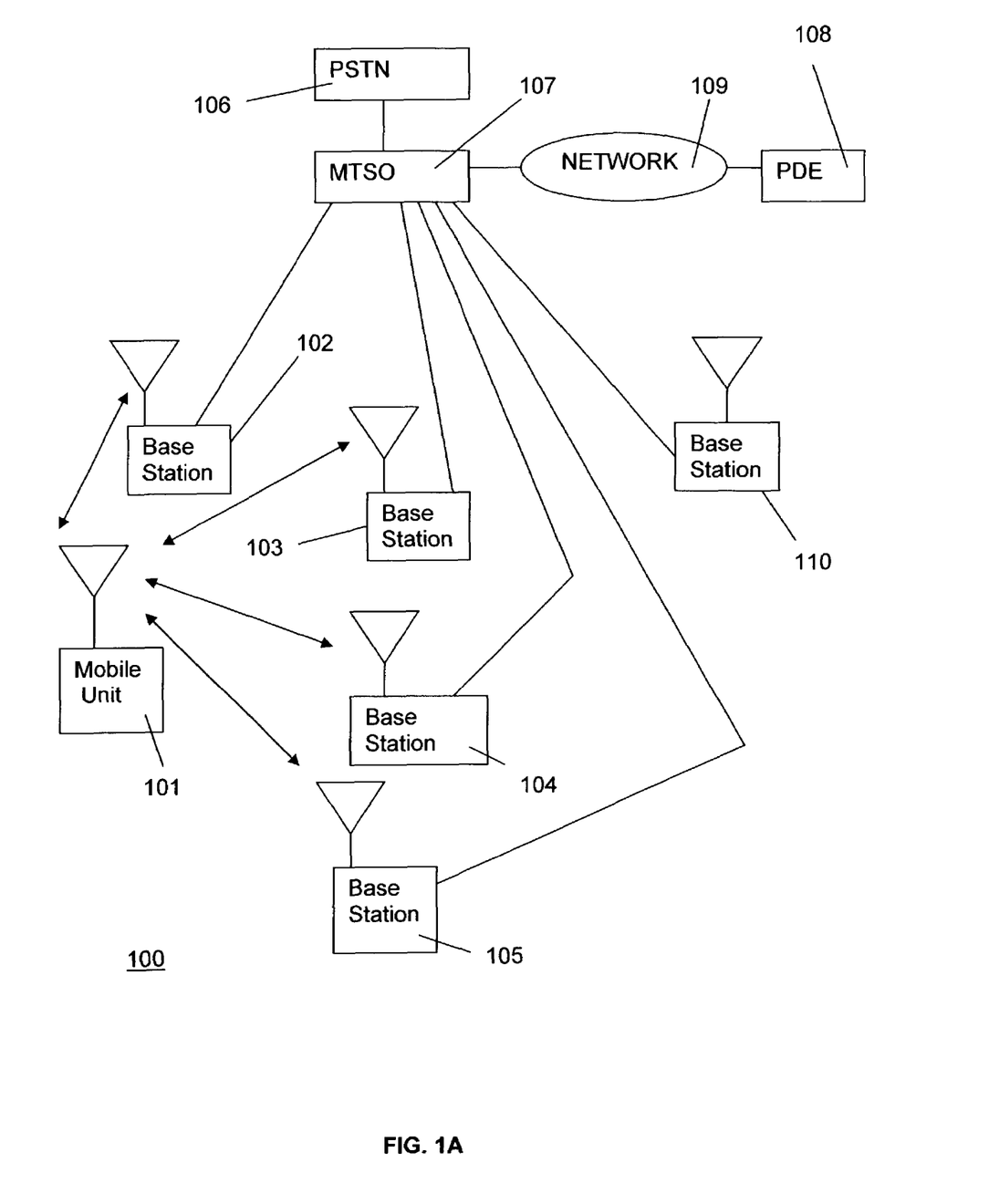
FIG. 1A is a block diagram illustrating a mobile telecommunication system using a method for determining best round trip delay (RTD) in a mobile telephone system according to an embodiment of the invention.

The present invention comprises a method for obtaining a round trip delay (RTD) indicator from among one or more RTD indicators associated with one or more rake receiver fingers based on a plurality of finger lock categories. Referring to FIG. 1A, there is shown a block diagram of a system 100 illustrating a simplified wireless telecommunications system using a method for determining a best round trip delay (RTD) according to an embodiment of the invention. The system 100 comprises a mobile unit 101 and a plurality of base stations 102-105 and 110, all of which represent a larger and more complex system. The base stations are connected to a mobile telephone switch office (MTSO) 107, which in turn is connected to a public switched telephone network (PSTN) 106. A position determining entity (PDE) 108 is connected to the MTSO by means of an SS7 network 109. According to a preferred embodiment of the invention, the system 100 operates under the Code Division Multiple Access (CDMA) protocol defined in the IS95/IS2000 standard but it can also operate under other DS spread spectrum technologies (e.g. UMTS) which use rake receiver modulation/demodulation techniques.

A Mobile Telecommunication System

FIG. 1A shows that the mobile unit 101 is in soft handoff with base stations 102-105, but not with base station 110. In this case base station 102 is the closest to the mobile unit 101. The PDE 108 has initiated a search for the location of mobile unit 101 by transmitting a request to the base stations 102-105 via the MTSO 107. In response to the request, each base station (102-105) in soft handoff executes a process for determining the best RTD indicator and associated quality metric available at the base station.

Once each of the base stations 102-105 makes the determination of the best RTD indicator for that base station, the selected RTD indicators, along with their quality metrics (discussed later), are forwarded by each of the base stations 102-105 to the PDE 108 for use in selecting an overall best RTD indicator (the best of the best) to be used in determining the location of mobile unit 101. In other embodiments there may be other uses for the RTD indicator and its associated quality metric.

Referring again to FIG. 1A, the mobile unit 101 transmits a signal which is received by base stations 102-105. For ease of discussion, the process for determining the best RTD indicator performed at each base station 102-105 will now be discussed with respect to base station 104.

Representation of Base Station 104

Figure 1B:
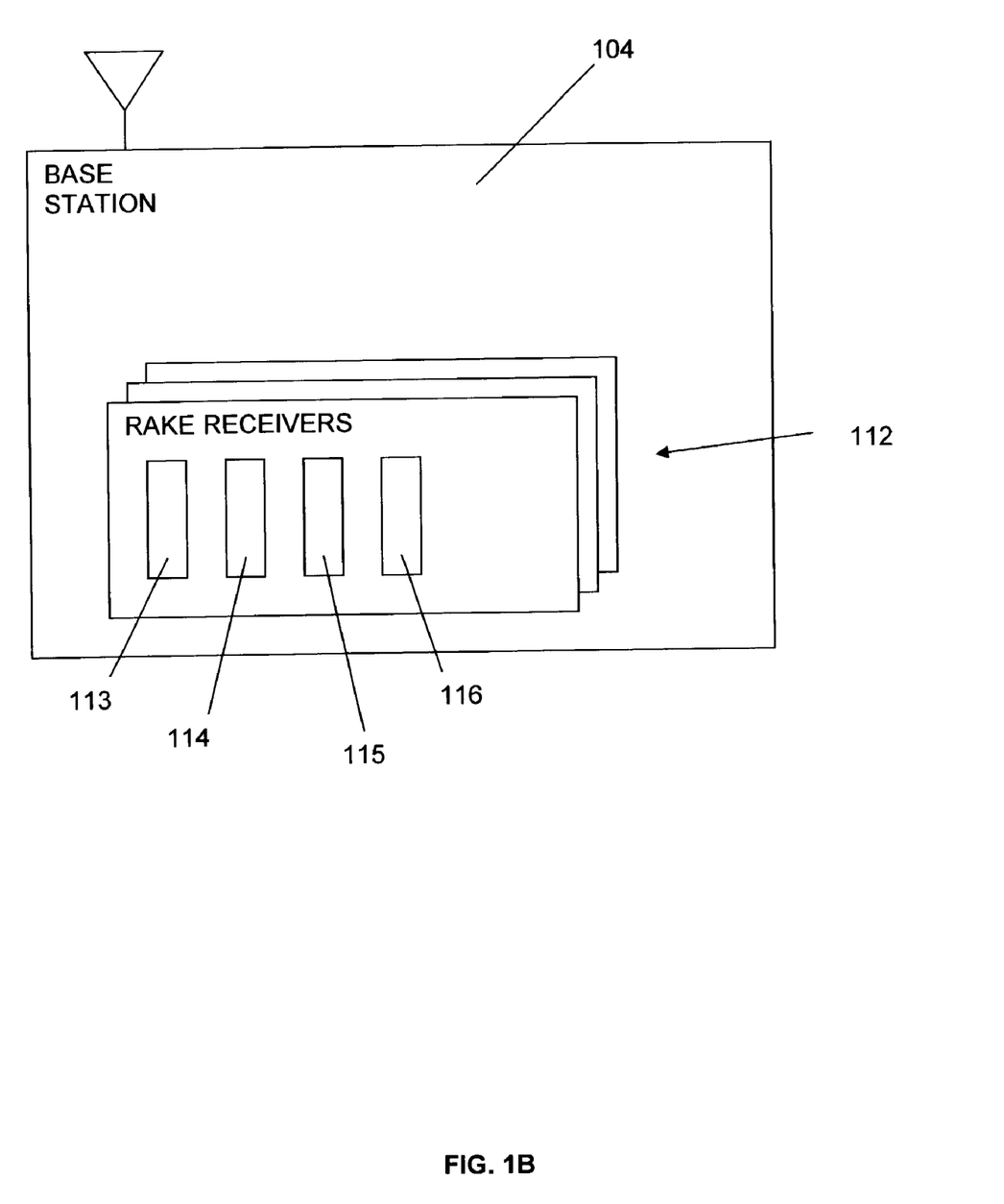
FIG. 1B shows a highly simplified structure of a base station typical of those shown in FIG. 1A.

Referring to FIG. 1B, the base station 104 is representative of the base stations in the system 100 and includes a plurality of rake receivers 112 each comprising a plurality of fingers 113-116. The base station 104 assigns one or more fingers 113-116 of one of the rake receivers 112 to a call from mobile unit 101. Each finger is assigned to a unique multi-path component of the signal transmitted by the mobile unit 101. Thus each finger is demodulating a unique multi-path component, which produces a copy of the mobile transmitted signal. Each of the demodulated multi-path components are later combined to reproduce a high quality mobile transmitted signal. This process is called rake combining of multi-path reception.

Each of the fingers of rake receiver 112 assigned to mobile unit 101 collects data relating to finger status parameters. These parameters, which in a preferred embodiment are derived from a chipset such as those produced by QUAL-COMM Incorporated, will be referred to as finger characteristics in general and in the preferred embodiment they include the following:

Rake Receiver Finger Characteristics:

LOCK_STATUS: This is a flag whose value is either a zero or a one. If this value is one (LOCK_STATUS=ON), this indicates that the finger is receiving a multi-path signal from a mobile unit and is demodulating that signal. If the value of the flag is zero (LOCK-STATUS=OFF, or out of lock), this means that the finger is either not receiving a multi-path signal, or it is not demodulating that signal.

LOCK_COUNT: This is a time reference, indicating how many intervals, referred to as power control groups (PCGs), a finger has been in its current LOCK_STATUS. The LOCK_ COUNT can have a value from 0 to 255 and is incremented by one. The LOCK_COUNT will go to a '0' state if the finger falls out of lock (LOCK_STATUS=0), and then will start counting the number of PCGs in the out of lock status. There are approximately 16 PCGs every 20 msec, which is a specific duration of 1.25 msec/PCG.

ASSIGN_COUNT: This indicates for how many permissible PCG counts a finger has been assigned to a given mobile unit. The ASSIGN_COUNT saturates at 255.

LOCK_ENERGY: This is a value which reflects the energy (or strength) of the demodulated mobile signal received at the rake receiver finger (hereinafter ENERGY).

PN_OFFSET: This is the current Pseudo Noise (PN) offset of a finger. It is one form of RTD indicator and is used to determine the RTD indicator.

According to an embodiment of the invention, these finger characteristics are used to determine finger lock categories for at least one of the assigned rake receiver fingers. Then the finger lock categories are used to select a rake receiver finger from among the one or more rake receiver fingers. Once a rake receiver finger is selected the RTD indicator associated with that rake receiver finger is recorded.

Assigning Finger Lock Categories

According to one embodiment of the invention, the base station 104 is either programmed for use by an embedded processor or equipped with hardware (e.g., an application specific integrated circuit (ASIC)) to perform the determination of the best RTD indicator.

The base station 104 performs a method for determining the best RTD indicator available from its rake receiver fingers assigned to the call from the mobile unit 101 by classifying each of its rake receiver fingers using one of four finger lock categories described below. The base station 104 collects the finger characteristics for each finger assigned by the base station 104 to demodulate a multi-path signal from the mobile unit 101 and classifies each finger into one of a plurality of finger lock categories based at least in part on the collected finger characteristics, such as LOCK_COUNT, ASSIGN_COUNT.

These are the categories relating to finger lock, in order from optimal to least favorable: (1) Matured-Locked-Finger; (2) Newly-Locked-Finger; (3) On/Off-Locked-Finger; or (4) Out-of-Lock-Finger. After the assigned fingers are classified into one of the above four finger lock categories, one finger is selected as a "best" finger, based at least in part on the finger lock category assigned to that finger, as described later herein. The best finger's PN_OFFSET value is recorded. There is a PN_OFFSET value associated with each finger assigned to each cell. Note that while base station 104 is performing this determination, the other base stations 102, 103, and 105 are also performing their own determination of best finger.

Figure 2:
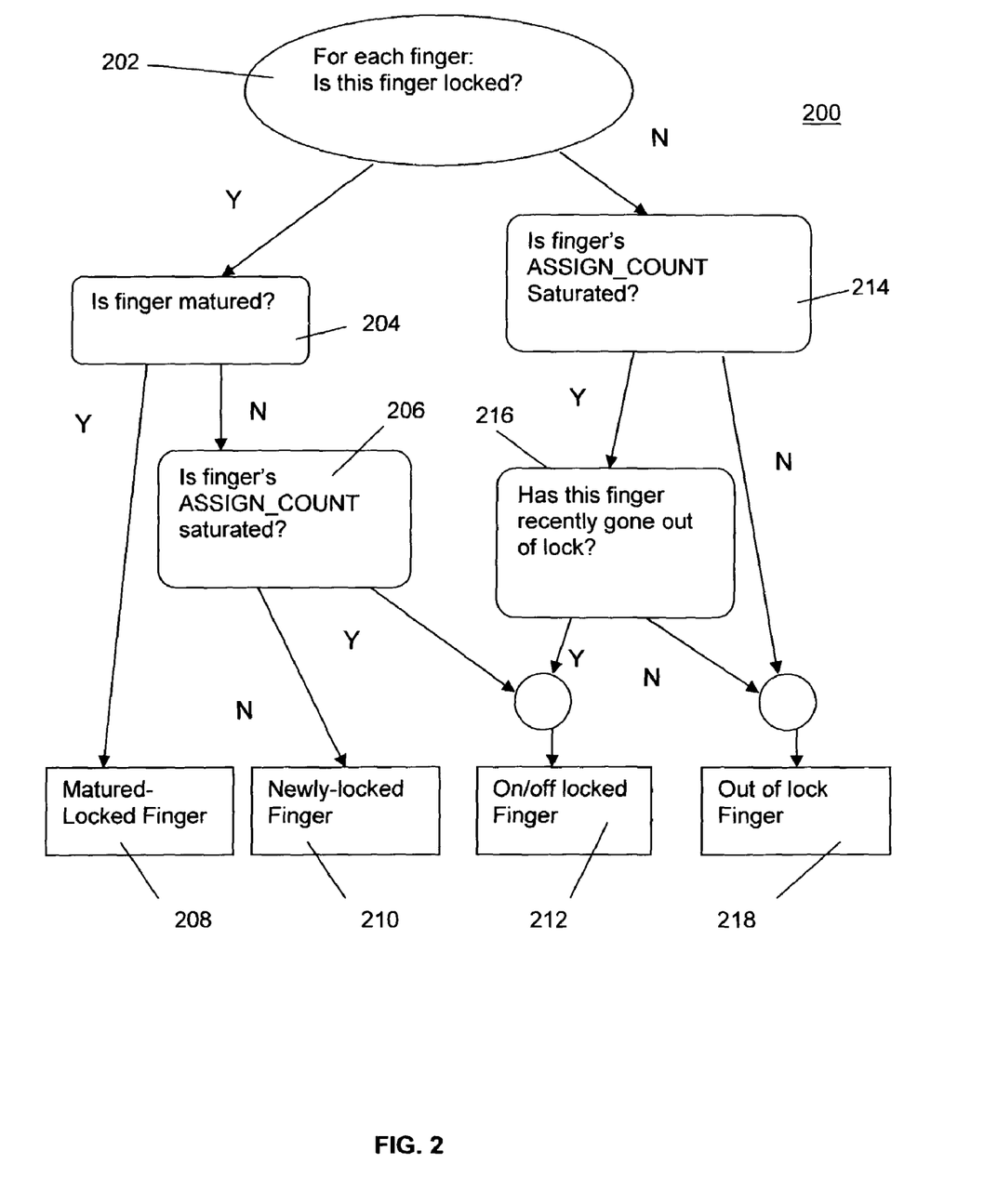
FIG. 2 is a flow chart illustrating a method for placing fingers in finger lock categories according to an embodiment of the invention.

To illustrate the assignment of fingers to finger lock categories, we will refer now to a flow chart 200, shown as FIG. 2. In a preferred embodiment, each finger of a rake receiver 112 assigned to the mobile unit 101 call passes through this process of classification one by one and is classified into one of four categories below. Alternatively, the classification process could end once a Matured-Locked-Finger is found since this is considered to be the category representing the optimal finger lock characteristics.

First, in step 202, there is a determination made for each finger to determine whether the finger is locked to a multi-path signal. At first, the finger characteristic, LOCK_STATUS, of each assigned finger is examined. If a finger is locked, i.e. the LOCK_STATUS bit is set to one; in step 204 the LOCK_COUNT value is compared with a threshold amount called the MATURE_LOCK_COUNT_THRESHOLD. This threshold value signifies the LOCK_COUNT needed for a locked finger to become mature (i.e., the finger has been in the lock state (LOCK_STATUS=1) for at least a specified period or threshold). For example this threshold can be set to 16 for CDMA 2G (IS95) calls and 64 for CDMA 3G-1X (IS2000) calls.

Matured-Locked-Finger Category:

If the LOCK_COUNT is greater than the above MATURE_LOCK_COUNT_THRESHOLD, the finger is designated as a Matured-Locked-Finger in step 208.

Newly-Locked-Finger Category:

If the finger is not a Matured-Locked-Finger (LOCK_COUNT<=MATURE_LOCK_COUNT_THRESHOLD), but it is locked (LOCK_STATUS=1), a further determination is made in step 206 as to whether the finger's ASSIGN_COUNT is saturated. The ASSIGN_COUNT is saturated when it reaches the maximum value (255 in the preferred embodiment). In the preferred embodiment, the maximum value (or the SATURATED_ASSIGN_COUNT_THRESHOLD) is 255 (8 bits). If it is not saturated (ASSIGN_COUNT<SATURATED_ASSIGN_COUNT_THRESHOLD), the finger is designated as a Newly-Locked-Finger in step 210.

On/Off-Locked-Finger Category (When a finger is locked):

In step 206, if it is determined that the finger is not a Matured-Locked-Finger but it is locked (LOCK_STATUS=1) and if its ASSIGN_COUNT is saturated (ASSIGN_COUNT>=SATURATED_ASSIGN_COUNT_THRESHOLD), it is designated as an On/Off-Locked-Finger in step 212.

For a given finger, if the determination in step 202 is negative (i.e., finger is not locked), then a further determination is made in step 214 as to whether the finger's ASSIGN_COUNT is saturated (ASSIGN_COUNT>=SATURATED_ASSIGN_COUNT_THRESHOLD). If the ASSIGN_COUNT is saturated, a determination is made in step 216 to determine whether the finger has recently gone out of lock.

On/Off-Locked-Finger Category (When a finger is not locked):

To determine how recently the finger went out of lock (LOCK_STATUS=0), the base station 104 compares the finger LOCK_COUNT of the subject finger with a threshold value called the ON/OFF_UNWORTHY_OUT_OF_LOCK_COUNT_THRESHOLD. This threshold represents how long the finger has been in its current out of lock LOCK_STATUS (i.e., how long ago it was in the locked state). In the preferred embodiment it is set to 10 for CDMA 2G calls and 40 for CDMA 3G-1X calls. If the finger's LOCK_COUNT is less than the ON/OFF_UNWORTHY_OUT_OF_LOCK_COUNT_THRESHOLD, the base station 104 considers that the finger has recently gone out of lock.

Now in step 214 the base station 104 has determined that the finger's ASSIGN_COUNT is saturated (ASSIGN_COUNT>=SATURATED_ASSIGN_COUNT_THRESHOLD) and the finger has recently gone out of lock, as determined in step 216, which means that the finger was assigned to the call a long time ago but it is frequently getting in and out of the lock state. Since the finger is toggling between lock (LOCK_STATUS=1) and unlock (LOCK_STATUS=0) states and also it has just recently gone out of lock, in step 212, the base station 104 determines that the finger is a relatively good source of information and designates it as an On/Off-Locked-Finger.

Out-of-Lock-Finger Category:

If the finger is not locked as determined in step 202, its ASSIGN_COUNT is saturated (ASSIGN_COUNT>=SATURATED_ASSIGN_COUNT_THRESHOLD) as determined in step 214, and step 216 determines that the finger has not recently gone out of lock then it is designated as an Out-of-Lock-Finger in step 218. Alternatively, this finger could be designated as an Out-of-Lock-Finger if step 202 determines that it is not locked and step 214 determines that its ASSIGN_COUNT is not saturated (ASSIGN_COUNT<SATURATED_ASSIGN_COUNT_THRESHOLD).

Best RTD Indicator Determination

Once each finger for each base station has been classified into one of the above categories, we obtain an RTD indicator associated with the fingers. The steps for determining the best RTD indicator are as follows and will be described more fully below:

1. Each base station assigns a finger lock category to each of its rake receiver fingers, based on finger characteristics;
2. Each base station then selects the best finger from among its rake receiver fingers, based in part on finger lock categories;
3. Once a best finger is selected, each base station records the ENERGY, TIMESTAMP, and PN_OFFSET values for the selected finger;
4. A network node such as the position determining entity (PDE 108) or the base station itself, polls the base stations, collecting the values for the best RTD indicator from each base station involved in the handoff (note: this step is optional);
5. The PDE 108, or the base station, then selects the best RTD indicator from among the RTD indicators it has collected.

Selecting the BEST Finger for each Base Station

After performing the finger classification for each finger based on the finger lock characteristics, base station 104 performs a process to find the best rake receiver finger from which to obtain an RTD indicator by polling all the fingers of each of the base stations in contact with the mobile unit 101 and recording the RTD (which includes the smallest PN_OFFSET), finger ENERGY, and the TIMESTAMP associated with the best finger selected from each base station. The RTD indicator associated with higher ENERGY and/or later TIMESTAMP is considered to be the best (more accurate) measurement.

The best RTD indicator from the base station in soft handoff may also be used to determine geo-location via the geo-location algorithms mentioned earlier (EFLT and AFLT). In addition to determining geo-locations, the RTD indicators and associated quality metrics (for the best RTD indicator) may be used to select base stations to which mobile units may be in handoff. For example, when an RTD indicator from a base station exceeds a certain threshold, the mobile unit initiates a mobile-assisted handoff (MAHO) to that base station.

Figure 3:
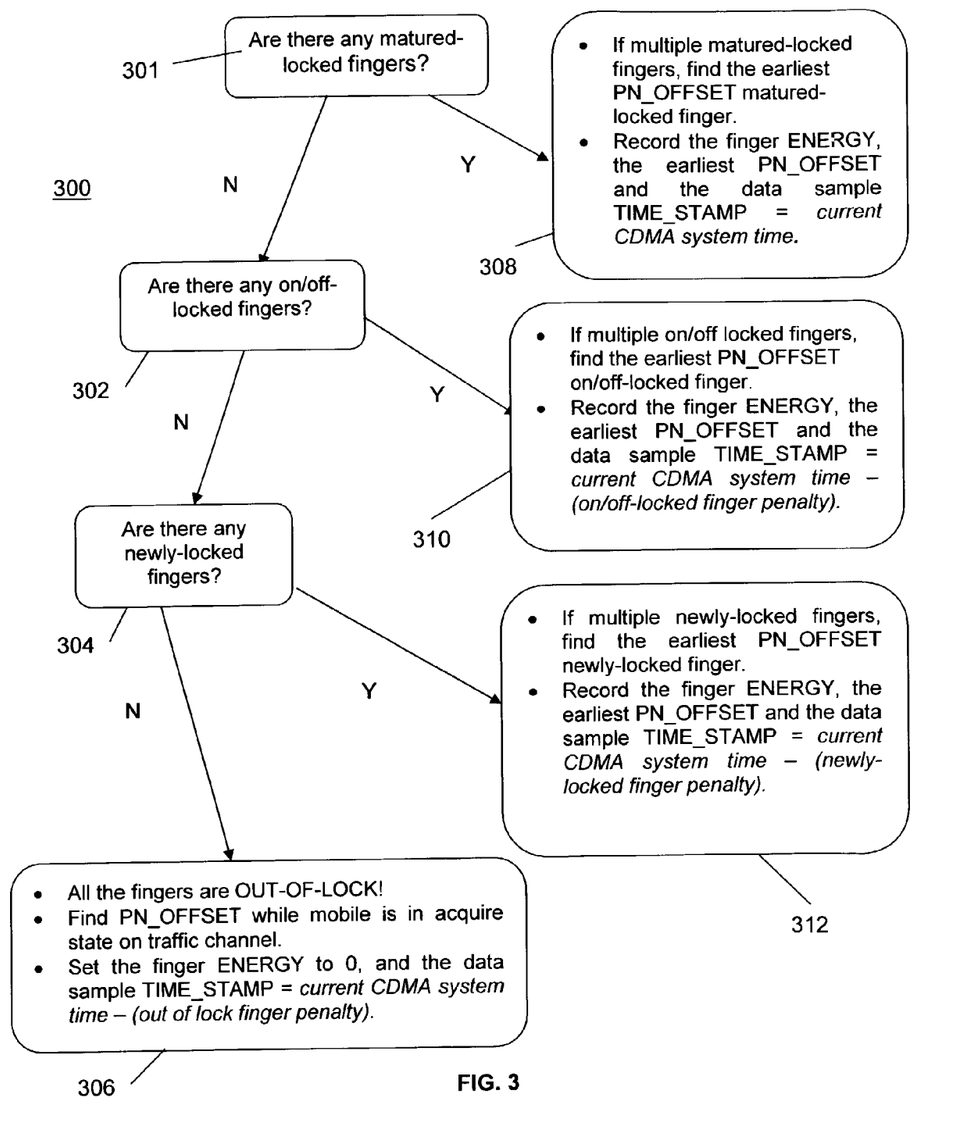
FIG. 3 is a flow chart illustrating a method for selecting a finger from which to obtain an RTD indicator according to an embodiment the invention.

Each base station in contact with the mobile unit 101 (base stations 102-105) will need to poll each of their rake receiver fingers to find the best finger after having classified each of their fingers into one of the four finger lock categories. The optimal finger lock category is considered to be the Matured-Locked-Finger category. FIG. 3 illustrates a method 300 which each base station uses for selecting the best finger for obtaining an RTD indicator and determining a quality metric according to an embodiment of the invention.

In order to compare and select a best RTD indicator from among the RTD indicators received from each base station, a system is devised whereby the TIMESTAMP value of the quality metric is accorded a "penalty" depending on the finger lock category to which the best finger belongs. The reason for this is to ascertain that the comparison values are meaningful. For example, if the best finger (the finger with the best RTD indicator) from base station 103 is a Newly-Locked-Finger and the best finger from base station 104 is a Matured-Locked-Finger, then there must be some way to weight these RTD indicators, since the position determining entity (PDE) will only refer to the RTD indicator and quality metric values, not the finger lock category. Accordingly, the TIMESTAMP associated with the best RTD indicator recorded at base station 103 will be penalized. This means that the TIMESTAMP value will be adjusted so that the TIMESTAMP appears older (later), thereby increasing the probability that base station 103's RTD indicator will have a less favorable value than the RTD indicator from base station 104.

The penalty is based on a conservative heuristic estimate of the difference between the measured TIMESTAMP value and what that value would be if the finger were a Mature-Locked-Finger. The penalty allows the PDE 108 to take into account the shortcomings of this category in using the recorded RTD indicator in determining the position of the mobile unit 101.

The BEST Matured-Locked-Finger:

Each base station considers that the first and best finger lock category from which to select the best finger is the Matured-Locked-Finger category. A determination is thus made in step 301 as to whether there are any Matured-Locked-Fingers assigned to the mobile call. If there is more than one Matured-Locked-Finger, in step 308 the system selects as the best finger the one having the smallest PN_OFFSET value (which indicates the smallest RTD indicator).

Then the base station records the RTD indicator associated with the selected best finger as the best RTD indicator for that base station and records the best finger ENERGY value and the TIMESTAMP as the associated quality metric. Here the TIMESTAMP is set to the (e.g. CDMA) system time when the best RTD indicator was recorded. This category is considered the best, therefore there is no penalty accorded to the TIMESTAMP.

The BEST On/Off-Locked-Finger:

The base stations consider that the second best category from which to select the best finger is the On/Off-Locked-Finger category. In step 302, if the base station does not find any Matured-Locked-Fingers, it examines the next finger lock category to select the best finger. If there are more than one On/Off-Locked-Fingers, in step 310 the system selects the best finger as the one having the smallest PN_OFFSET value (i.e. the lowest RTD indicator). An On/Off-Locked-Finger will provide a less accurate RTD indicator than a Mature-Locked-Finger; therefore the TIMESTAMP value component of the quality metric is adjusted by a penalty value. The TIMESTAMP quality metric is set to the current CDMA system time minus the ON/OFF_LOCKED_FINGER_PENALTY and then the finger ENERGY is recorded.

The BEST Newly-Locked-Finger:

The base stations consider that the third best category from which to select the best finger is the Newly-Locked-Finger category. In step 304 the system determines whether there are any Newly-Locked-Fingers. A Newly-Locked-Finger is viewed as a good source of information if there are neither Matured-Locked-Fingers nor On/Off-Locked-Fingers available.

If there is more than one Newly-Locked-Finger, at step 312 the base station selects the best finger as the Newly-Locked-Finger having the smallest PN_OFFSET value (i.e. the lowest RTD indicator. Similarly to the On/Off-Locked-Finger, the TIMESTAMP quality metric will include a "medium penalty" because using a Newly-Locked-Finger is less desirable than using an On/Off-Locked-Finger for obtaining an RTD indicator. Also at step 312, the base station records the finger ENERGY, the smallest PN_OFFSET (RTD indicator), and the TIMESTAMP as equal to the current CDMA system time minus the NEWLY_LOCKED_FINGER_PENALTY.

Out-of-Lock-Finger:

Else, if there are no Matured-Locked-Fingers, On/Off-Locked-Fingers, or Newly-Locked-Fingers, that means all the fingers are categorized as Out-of-Lock-Fingers. Then in step 306 the method uses the last recorded RTD indicator while the mobile unit 101 was in the acquire state on a traffic channel. The system then sets the finger ENERGY to 0, and the TIMESTAMP to the current CDMA system time minus the OUT_OF_LOCK_FINGER_PENALTY.

Selecting a Best Finger from Among Base Stations

After selecting a best finger from each of the base stations in contact with the mobile unit 101 (base stations 102-105), a further selection will be made to choose the best finger from among the base stations 102-105.

While polling each base station involved in soft handoff (base stations 102-105) for the best finger from which to determine the best RTD indicator it is undesirable to use an RTD indicator from a base station that is receiving a weak signal from the mobile unit 101 because its measurement is likely to be unreliable. Therefore, as responses to polling are received by the PDE 108, the quality metric relating to each RTD indicator from every base station involved in the handoff, are used to determine the best (most accurate) RTD indicator, as discussed below. In one possible application of the method described herein, the RTD indicator could then be used to determine a location.

Example of Application of the System for Determining a Best RTD Indicator

After the best finger is selected at each base station, its associated RTD indicator is recorded, and a quality metric is determined and recorded for each best finger. As an example of an application of the system for selecting an RTD indicator according to the invention, we will limit our discussion to base station 104. After base station 104 selects the best finger from among its rake receiver fingers, it will either obtain the same information from other base stations in the soft handoff (base stations 102, 103 and 105 in this example) and make the location determination itself or it will transmit all of its recorded information to another node (e.g., MTSO 107) that will collect the recorded information from every other base station involved in the soft handoff for determination of the location of the mobile unit 101. In other words, the base station 104 could make the best finger determination itself from among all of the base stations' (102-105) best finger "candidates" or it can simply transmit its information to the MTSO 107 and let it make the determination.

The (PDE) (e.g. node 108) may need to make a further selection among the information it has received. To compare among the RTD indicators received from multiple cells, the PDE 108 will use the quality metrics, such as TIMESTAMP and ENERGY, associated with each best finger.

To compare values obtained from multiple base stations, first the TIMESTAMPS associated with each RTD indicator are compared. If one TIMESTAMP value is newer (i.e., later in time) than another by a specific threshold (by more than 15 msec, for example), the newer one is considered better quality because it represents the more current available information. If the TIMESTAMPS are within the aforementioned threshold, the RTD indicators associated with those TIMESTAMPS are considered to have essentially the same value, and the ENERGY value is used to distinguish between the two (i.e., a tie-breaker). Note that the specific threshold is used, rather than going to the tie-breaker procedure only when the TIMESTAMPS are identical or close. The threshold represents the accuracy of the TIMESTAMP mechanism, and is the definition of "essentially the same" TIMESTAMP. In other words, two TIMESTAMPS differing by the threshold value or less are considered the same because the TIMESTAMP mechanism cannot resolve time differences smaller than the threshold amount.

In such a case the PDE 108 examines the ENERGY component of each quality metric for the RTD indicators being compared and the RTD associated with the highest ENERGY level is selected. Thus, a higher ENERGY value for a received signal compels the selection of associated RTD indicator as best in terms of quality.

The best finger selection system and method discussed above determines from which finger on a given cell to obtain an RTD indicator, and generates a quality metric in the form of a TIMESTAMP and ENERGY of the received multi-path signal at that finger.

An advantage of the system in the embodiment described herein is that it generates an RTD indicator based on counts that must already be kept in the channel element for the basic demodulator operation and thus it does not require keeping a TIMESTAMP history. This is beneficial because many new systems do not keep a TIMESTAMP history. Another advantage of the "best finger" determination system according to the invention is that it will inter-operate with some older systems that maintain a TIMESTAMP history.

The best finger selection system described herein can be implemented in various embodiments, including as a software algorithm on an embedded processor or as part of the rake receiver hardware on a CDMA modem ASIC (Application-Specific Integrated Circuit). The system can be advantageously implemented on or for use with a CDMA 3G-1X ASIC or as an enhancement or feature for implementation of the E911 and other geo-location services or systems.

The systems and algorithms described herein can be implemented for any DS spread spectrum technology which uses a rake receiver demodulation technique, such as the Universal Mobile Telecommunications System (UMTS).

The RTD indicator and its associated quality metric can be used for any purpose or in any application in which the distance between a mobile unit and a base station and the quality of communication between them are input parameters. Therefore, while there has been described what is presently considered to be the preferred embodiment or embodiments, it will be understood by those skilled in the art that other modifications and/or applications can be made within the spirit of the invention.

We claim:

1. A method for determining a best round trip delay (RTD) indicator for mobile telephone signals originating from a mobile unit and received at a plurality of base stations in a wireless telecommunications system comprising at least some base stations using rake receivers, each rake receiver comprising a plurality of fingers; the method comprising:

collecting a plurality of finger characteristics from one or more rake receiver fingers assigned to one or more multi-path components of a signal, at least some of the finger characteristics comprising information about the finger's time history;

determining finger lock categories for at least one of the assigned one or more rake receiver fingers using the collected one or more finger characteristics;

selecting a rake receiver finger from the one or more rake receiver fingers using the determined finger lock categories, wherein the selected rake receiver finger has an associated round trip delay indicator; and recording the round trip delay indicator corresponding to the selected rake receiver finger.

2. The method of claim 1, wherein the step of determining a finger lock category further comprises classifying each rake receiver finger assigned to the signal into a finger lock category from a group consisting of: (1) Matured-Locked-Finger; (2) Newly-Locked-Finger; (3) On/Off-Locked-Finger; and (4) Out-of-Lock-Finger.

3. The method of claim 2, wherein if no finger is classified as a Matured-Locked-Finger, the step of determining a finger lock category comprises determining whether at least one finger is an On/Off-Locked-Finger.

4. The method of claim 3, wherein if it is determined that there is one On/Off-Locked-Finger, the selecting step comprises selecting the On/Off-Locked-Finger as the finger from which to record the round trip delay indicator.

5. The method of claim 4, wherein if it is determined that there is more than one On/Off-Locked-Finger the selecting step comprises selecting the On/Off-Locked-Finger having the smallest round trip delay indicator.

6. The method of claim 3, wherein if it is determined that no finger is an On/Off-Locked-Finger the selecting step comprises determining whether at least one finger is a Newly-Locked-Finger.

7. The method of claim 6, wherein if it is determined that one finger is a Newly-Locked-Finger the selecting step comprises selecting the Newly-Locked-Finger as the finger from which to record the round trip delay indicator.

8. The method of claim 7, wherein if it is determined that there is more than one Newly-Locked-Finger, the selecting step comprises selecting the Newly-Locked-Finger having the smallest round trip delay indicator as the finger from which to record the round trip delay indicator.

9. The method of claim 7, wherein if it determined that no linger is a Newly-Locked-Finger the method comprises determining that all the fingers are Out-of-Lock-Fingers and further comprises finding the round trip delay indicator of the mobile telephone signal while the mobile unit was in an acquire state.

10. The method of claim 1 wherein the selecting step further comprises determining a quality metric for the selected round trip delay indicator.

11. The method of claim 10 further comprising sending the selected round trip delay indicator and the quality metric to another network node.

12. The method of claim 10, wherein the step of determining a quality metric further comprises recording an ENERGY level and a TIMESTAMP associated with the selected rake receiver finger.

13. The method of claim 10, wherein the step of determining a quality metric further comprises adjusting the TIMESTAMP value using an assigned penalty value.

14. The method of claim 13 wherein the assigned penalty value is based on finger lock categories.

15. The method of claim 1 wherein the round trip delay indicator comprises a PN_OFFSET measurement.

16. The method of claim 1 further comprising the step of collecting one or more round trip delay indicators from the plurality of base stations.

17. The method of claim 16 wherein the collected one or more round trip delay indicators are associated with base stations in soft handoff.

18. The method of claim 16 further comprising selecting a round trip delay indicator from among the round trip delay indicators collected from the plurality of base stations, wherein the quality metric is used as a criterion for selection.

19. The method of claim 18 wherein the selected round trip delay indicator is used to determine a location.

20. The method of claim 2 wherein, if a rake receiver finger assigned to the signal is a Matured-Locked-Finger the selecting step comprises selecting the Matured-Locked-Finger as the finger from which to record the round trip delay indicator.

* * * * *